United States Patent
Thompson et al.

(10) Patent No.: US 8,784,068 B2
(45) Date of Patent: *Jul. 22, 2014

(54) SYSTEM AND METHOD FOR SENSING A LIQUID LEVEL

(71) Applicant: Chevron U.S.A., Inc., San Ramon, CA (US)

(72) Inventors: M. Clark Thompson, Los Alamos, NM (US); Charles H. Webb, Bakersfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,515

(22) Filed: Dec. 24, 2012

(65) Prior Publication Data

US 2013/0108474 A1    May 2, 2013

Related U.S. Application Data

(63) Continuation of application No. 12/573,434, filed on Oct. 5, 2009, now Pat. No. 8,353,677.

(51) Int. Cl.
F04B 49/00 (2006.01)
F04B 35/04 (2006.01)
E21B 47/00 (2012.01)

(52) U.S. Cl.
USPC ............ 417/36; 417/423.3; 166/250.03

(58) Field of Classification Search
USPC .................. 417/36, 423.3; 166/250.03
See application file for complete search history.

(56) References Cited

U.S. PATENT DOCUMENTS

| | | | |
|---|---|---|---|
| 3,320,579 | A | 5/1967 | Abbott |
| 3,562,741 | A | 2/1971 | McEvoy et al. |
| 4,023,136 | A | 5/1977 | Lamensdorf et al. |
| 4,135,397 | A | 1/1979 | Krake |
| 4,160,970 | A | 7/1979 | Nicolson |
| 4,218,507 | A | 8/1980 | Deffeyes et al. |
| 4,308,499 | A | 12/1981 | Thierbach et al. |

(Continued)

FOREIGN PATENT DOCUMENTS

| | | |
|---|---|---|
| DE | 10245425 A1 | 4/2003 |
| EP | 0314654 A1 | 5/1989 |

(Continued)

OTHER PUBLICATIONS

Mexican Office Action for MX/a/2012/003960, mailed Jun. 10, 2013, 2 pages.

(Continued)

*Primary Examiner* — Charles Freay
(74) *Attorney, Agent, or Firm* — Pillsbury Winthrop Shaw Pittman, LLP

(57) ABSTRACT

A system, method and device may be used to monitor fluid levels in a borehole. The system includes a pulse generator to generate a pulse of electromagnetic energy to propagate along the wellbore towards a surface of the fluid, a detector to detect a portion of the electromagnetic pulse reflected from the surface of the fluid and propagated along the wellbore towards the detector, a processor to analyze detected signals to determine a level of the surface of the fluid, and a pump controller to control the operation of a pump located in the wellbore based on the fluid surface level.

18 Claims, 3 Drawing Sheets

(56) References Cited

U.S. PATENT DOCUMENTS

| | | | |
|---|---|---|---|
| 4,430,577 A | 2/1984 | Bouquet | |
| 4,621,264 A | 11/1986 | Yashiro et al. | |
| 4,793,178 A | 12/1988 | Ahern et al. | |
| 4,839,644 A | 6/1989 | Safinya et al. | |
| 4,845,378 A | 7/1989 | Garbe et al. | |
| RE33,690 E | 9/1991 | Adams, Jr. et al. | |
| 5,150,067 A | 9/1992 | McMillan | |
| 5,355,714 A | 10/1994 | Suzuki et al. | |
| 5,423,222 A | 6/1995 | Rudd et al. | |
| 5,451,873 A | 9/1995 | Freedman et al. | |
| 5,467,083 A | 11/1995 | McDonald et al. | |
| 5,576,703 A | 11/1996 | MacLeod et al. | |
| 5,587,707 A | 12/1996 | Dickie et al. | |
| 5,680,029 A | 10/1997 | Smits et al. | |
| 5,686,779 A | 11/1997 | Vig | |
| 5,751,895 A | 5/1998 | Bridges | |
| H1744 H | 8/1998 | Clayton et al. | |
| 5,821,129 A | 10/1998 | Grimes et al. | |
| 5,917,160 A | 6/1999 | Bailey | |
| 5,936,913 A | 8/1999 | Gill et al. | |
| 5,942,991 A | 8/1999 | Gaudreau et al. | |
| 6,025,725 A | 2/2000 | Gershenfeld et al. | |
| 6,085,836 A | 7/2000 | Burris et al. | |
| 6,234,257 B1 | 5/2001 | Ciglenec et al. | |
| 6,237,410 B1 | 5/2001 | Dyck et al. | |
| 6,250,601 B1 | 6/2001 | Kolar | |
| 6,393,921 B1 | 5/2002 | Grimes et al. | |
| 6,434,372 B1 | 8/2002 | Neagley et al. | |
| 6,480,000 B1 | 11/2002 | Kong et al. | |
| 6,489,772 B1 | 12/2002 | Holladay et al. | |
| 6,525,540 B1 | 2/2003 | Kong et al. | |
| 6,633,236 B2 | 10/2003 | Vinegar et al. | |
| 6,640,628 B2 | 11/2003 | Lütke et al. | |
| 6,670,880 B1 | 12/2003 | Hall et al. | |
| 6,766,141 B1 | 7/2004 | Briles et al. | |
| 6,993,432 B2 | 1/2006 | Jenkins et al. | |
| 7,017,662 B2 | 3/2006 | Schultz et al. | |
| 7,114,561 B2 | 10/2006 | Vinegar et al. | |
| 7,158,049 B2 | 1/2007 | Hoefel et al. | |
| 7,168,487 B2 | 1/2007 | Salamitou et al. | |
| 7,180,826 B2 | 2/2007 | Kusko et al. | |
| 7,256,707 B2 | 8/2007 | Clark et al. | |
| 7,397,388 B2 | 7/2008 | Huang et al. | |
| 7,548,068 B2 | 6/2009 | Rawle et al. | |
| 8,353,677 B2 * | 1/2013 | Thompson et al. | 417/36 |
| 2002/0053239 A1 | 5/2002 | Fehrenbach et al. | |
| 2002/0195247 A1 | 12/2002 | Ciglenec et al. | |
| 2003/0010492 A1 | 1/2003 | Hill et al. | |
| 2004/0046571 A1 | 3/2004 | Champion et al. | |
| 2005/0110655 A1 | 5/2005 | Layton | |
| 2006/0266109 A1 | 11/2006 | DiFoggio | |
| 2007/0030762 A1 | 2/2007 | Huang et al. | |
| 2007/0107528 A1 | 5/2007 | Schroeder et al. | |
| 2007/0206440 A1 | 9/2007 | Fripp et al. | |
| 2007/0235184 A1 | 10/2007 | Thompson et al. | |
| 2008/0061789 A1 | 3/2008 | Coates et al. | |
| 2008/0184787 A1 | 8/2008 | Coates et al. | |
| 2008/0185328 A1 | 8/2008 | Stefanini | |
| 2008/0187025 A1 | 8/2008 | Coates et al. | |
| 2008/0253230 A1 | 10/2008 | Thompson et al. | |
| 2008/0264624 A1 | 10/2008 | Hall et al. | |
| 2009/0159361 A1 | 6/2009 | Coates et al. | |
| 2009/0174409 A1 | 7/2009 | Coates et al. | |

FOREIGN PATENT DOCUMENTS

| | | |
|---|---|---|
| EP | 1434063 A2 | 6/2004 |
| GB | 2386691 A | 9/2003 |
| GB | 2425593 A | 11/2006 |
| WO | 2011044023 A2 | 1/2011 |
| WO | WO2011044023 | 4/2011 |

OTHER PUBLICATIONS

International Search Report and Written Opinion regarding PCT/US2012/036523, mailed Aug. 28, 2012.

Henzler, Stephen, "Time-to-Digital Converter Basics." 2010, Springer Netherlands, XP002681818, ISBN: 978-90-481-8628-0 vol.

International Search Report and Written Opinion for PCT International Patent Application No. PCT/US2010/051283, mailed Apr. 19, 2012.

International Search report and Written Opinion for PCT International Patent Application PCT/US2010/051283m mailed Aug. 19, 2012.

Goswami et al., On Subsurface Wireless Data Acquisition System, IEEE Transactions on Geoscience and Remote Sensing, vol. 43, No. 10, Oct. 2005.

International Search Report and Written Opinion for PCT International Patent Application No. PCT/US2008-075214, mailed on Oct. 10, 2009.

International Preliminary Report on Patentability for PCT/US2012/036523, mailed Nov. 14, 2013, 6 pages.

Henzler, Stephen, "Time-to-Digital Converter Basics." 2010, Springer Netherlands, XP002681818, ISBN: 978-90-481-8628-0 vol. 29.

Chinese Office Action dated Feb. 18, 2014 for 201080044625.8.

Eurasian Office Action dated May 14, 2014 for Appln. No. 201270524.

* cited by examiner

SYSTEM AND METHOD FOR SENSING A LIQUID LEVEL

CROSS-REFERENCE TO RELATED APPLICATION

This application is a continuation of U.S. Application No. 12/573,434, filed Oct. 5, 2009, the entire contents of which are incorporated herein by reference.

BACKGROUND

1. Field

The present invention relates generally to remote sensing and more particularly to sensing a liquid level at a remote location in a borehole.

2. Background

In resource recovery, it may be useful to monitor various conditions at locations remote from an observer. In particular, it may be useful to provide for monitoring liquid levels at or near to the bottom of a borehole that has been drilled either for exploratory or production purposes. Because such boreholes may extend several miles, it is not always practical to provide wired communications systems for such monitoring.

SUMMARY

An aspect of an embodiment of the present invention includes an apparatus for measuring a fluid level in a casing-lined wellbore, including a pulse generator, positionable and operable to generate a pulse of electromagnetic energy to propagate along the wellbore towards a surface of the fluid, a detector, positionable and operable to detect a portion of the electromagnetic pulse reflected from the surface of the fluid and propagated along the wellbore towards the detector, a processor, configured and arranged to receive signals from the detector representative of the detected portion of the electromagnetic pulse and to analyze them to determine a level of the surface of the fluid, and a pump controller, configured and arranged to receive distance information from the processor and to use the distance information to control the operation of a pump located in the wellbore.

A method for controlling a pump located in a casing-lined wellbore, includes generating a pulse of electromagnetic energy to propagate along the wellbore towards a surface of the fluid, detecting a portion of the electromagnetic pulse reflected from the surface of the fluid and propagated along the wellbore towards the detector, receiving a signal from the detector representative of the detected portion of the electromagnetic pulse, analyzing the signal to determine a level of the surface of the fluid, and controlling the operation of the pump, based on the determined surface level of the fluid.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
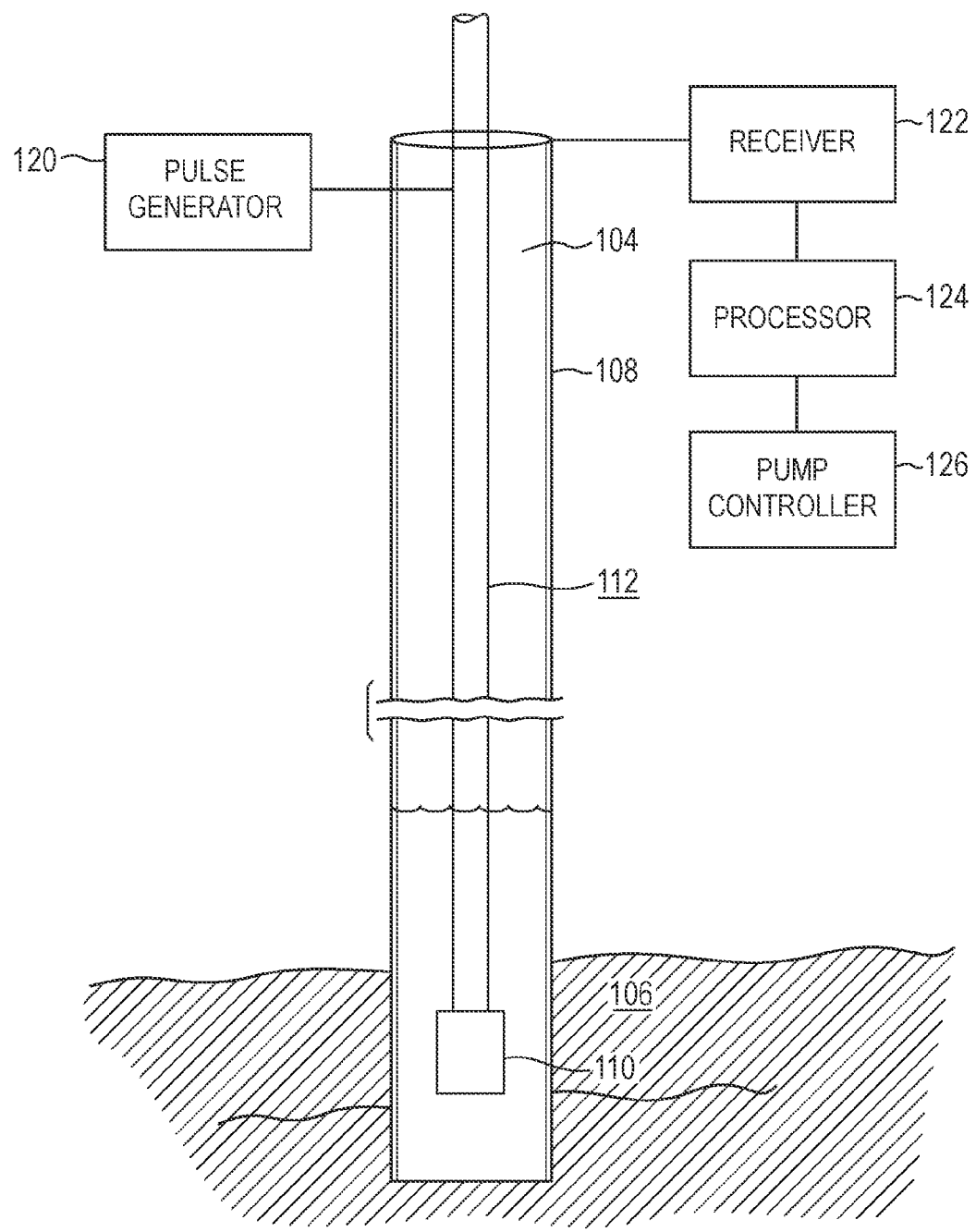
FIG. 1 is a schematic drawing of a system for remotely measuring a fluid level in a borehole in accordance with an embodiment of the present invention.

FIG. 1 illustrates an example of an apparatus 100 for sensing a surface level of a fluid 102 in a borehole 104. In the illustrated example, the borehole 104 extends through a hydrocarbon producing formation 106. Though the borehole 104 is illustrated as a straight, vertical bore, in practice the borehole will have a more complex geometry and can have any orientation, including varying orientation along its length.

The borehole is lined with a hollow casing 108 made up of a number of segments of generally conductive material. The hollow borehole casing 108 can, for example, be configured of steel or other suitable material. In a typical drilling application, the borehole casing 108 may be a standard casing used to provide structural support to the borehole in ordinary drilling and production applications and it is not necessary to provide any additional outer conductive medium.

Hydrocarbon production is facilitated when pressure in the producing formation 106 is greater than pressure within the borehole 104. In this regard, the level of the fluid 102 is important, as any accumulated fluid 102 within the borehole 104 that is at or above the level of the producing formation 106 will exert a pressure in opposition to the pressure of the producing formation 106.

It is useful to provide a downhole pump 110 that can produce artificial lift to facilitate production of oil or gas from the producing formation 106. The liquids from the formation are typically pumped to the surface via tubing 112, while gas rises to the surface by way of the annular area between the tubing 112 and the casing 108. It is generally wearing on such pumps for them to run dry should the fluid level in the borehole drop below an operating position of the pump 110. Thus, there is a balance to be struck between minimizing the fluid level to reduce counterproductive pressure in the borehole 104 and ensuring that pumps present in the borehole 104 are not allowed to run dry.

Examples of the types of downhole pumps that are used in this application include electrical submersible pumps, progressing cavity pumps, sucker-rod pumps and others.

In order to facilitate pump control such that fluid levels are kept low, but high enough to avoid running the pump dry, it is useful to provide for measurement of the fluid level. In embodiments, such measurement may be performed continuously and in real time. The fluid level measurement may usefully allow for potential confounding factors such as joints in the borehole casing or foaming near the fluid surface, which can produce incorrect measurements.

The apparatus 100 for measuring the fluid level includes a pulse generator 120. The pulse generator 120 is configured to produce an electromagnetic pulse, which will be transmitted along the length of the borehole, with the casing acting as a waveguide. In this case, the tubing 112 acts as a central conductor and the casing/tubing system together essentially form a coaxial cable.

The pulse generator 120 may be coupled into the borehole by a direct attachment or may be otherwise electromagnetically coupled to the borehole.

The pulse generator 120 may be any device including, but not limited to, an electronic structure for receiving electromagnetic energy and generating a signal therefrom. Examples of suitable pulse generators include spark gap generators, a network analyzer such as a Bode box or other devices that, for example, make use of fast switching components such as avalanche transistors or fast SCRs. Useful devices include those that are capable of producing 10-100 A with a voltage that can be varied by 30v/ns or more. In general, radio frequency electromagnetic pulses are well-suited to this application, in particular in a range from about 3 MHz to 100 MHz. The frequency can be selected as a function of the material characteristics of the conductive pipe (e.g., steel). Skin depth can limit use of high frequencies above a certain point, and a lower end of the available frequency range can be selected as a function of the simplification of the construction of the pulse generator.

As the pulse propagates along the borehole, changes in impedance result in partial reflections of the energy of the pulse, which reflections may then be received at the surface with a receiver or detector 122 module of the apparatus 100. Such impedance changes may result from joints in the casing, the presence of objects in the borehole, or the like. At the fluid interface, near total reflection of the remaining energy in the electromagnetic pulse occurs as the fluid acts to short circuit the borehole.

A processor 124 is used to analyze the received signals to determine the fluid level. Furthermore, the processor 124 may be used to operate a pump controller 126 to change an operation state of the pump 110, based on the measured fluid level. The pump controller may be linked directly (not shown) or wirelessly to the pump 110. In particular, the pump controller 126 may reduce pumping capacity by adjusting pump operation speed or stroke if the fluid level is near (within a few feet or a few tens of feet) the pump level, or it may stop the pump completely if the pump level is above the fluid level. Similarly, if the fluid level in the wellbore rises higher than is necessary to keep the pump from running dry, the controller may increase pump capacity. The amount higher than pump level at which pump capacity should be increased may be selected, either by a user or it may be pre-determined and programmed into the controller.

Successive measurements may be used to determine a magnitude and direction of change of the fluid level. In this embodiment, either or both of the magnitude and direction may be used to control the pump capacity. Thus, if the fluid level is changing rapidly, the pump capacity may be changed rapidly as well. Likewise, if the fluid level is near the pump level, but is increasing, the controller may reduce pump capacity by only a small amount in order to maintain the fluid level rather than reducing by a large amount which may tend to increase the fluid level undesirably.

Figure 2:
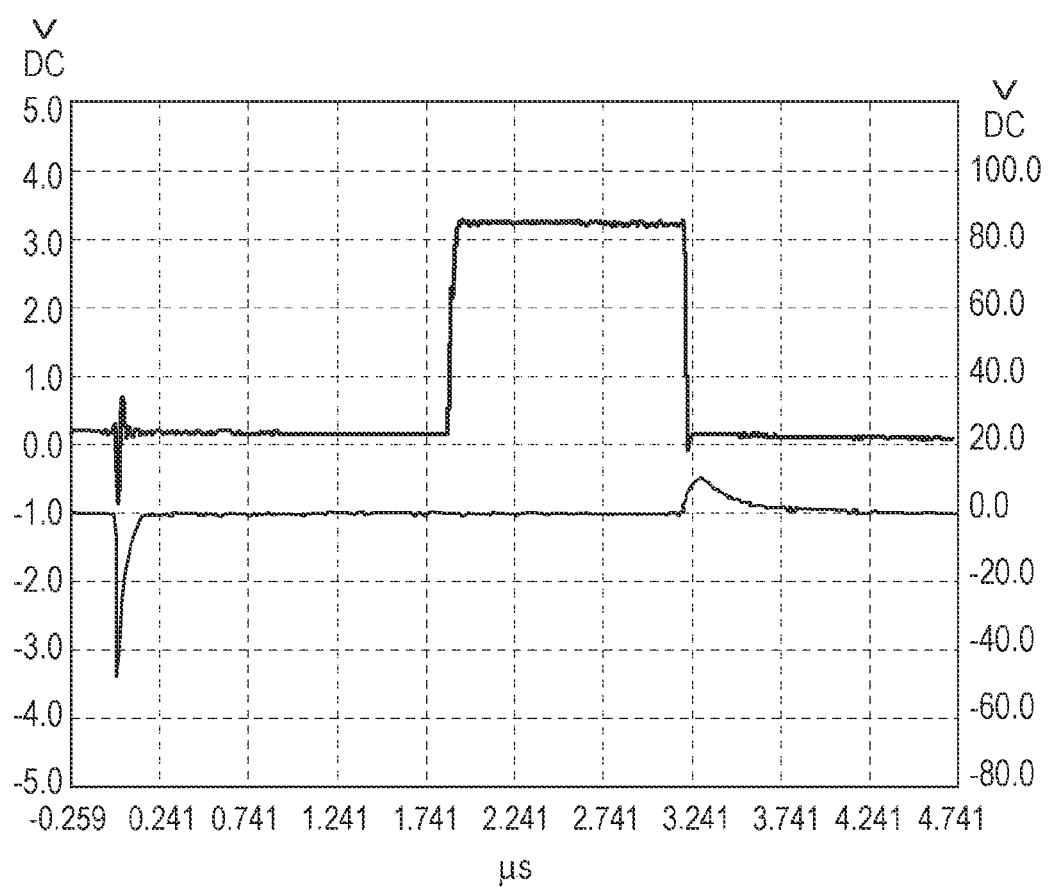
FIG. 2 is a trace illustrating a return signal reflected from a location in a simulated borehole.

FIG. 2 is a trace of a return signal from a simulated 1600 foot well received by the receiver 122. Based on a measure of the time delay between launching the pulse and receiving the return signal, a distance along the borehole can be calculated using the processor 124:

$$d = t \cdot c \qquad \text{Eqn. 1}$$

where d is the total distance to the fluid and back again to the detector at the surface, i.e., double the distance between the surface and the fluid, t is the delay time and c is the speed of propagation of the electromagnetic energy in air.

The top line of FIG. 2 represents detector on-time. When the voltage is high (about 3V), the detector is on. As illustrated, this corresponds to times between about 1.741 µs and about 3.241 µs. In this example, once a signal is detected, the detector is powered off, though this is not a requirement. The lower line in FIG. 2 represents the detected signal. As may be seen, an impulse was recorded at about 3.241 µs. As described above, this time represents twice the time the signal takes to propagate along the well in one direction. Therefore, the distance from the surface to the fluid is, as expected, about 1600 ft (where one foot is approximately equivalent to a 1 ns delay).

In an embodiment, a threshold may be set, such that returns below the threshold which are more likely to represent casing joints, for example, are ignored. In one approach, a user may set a delay such that no returns received prior to the end of the delay time are allowed to trigger the apparatus, thereby reducing false readings. In FIG. 2, this corresponds to the interval between zero and 1.741 µs. A longer delay would result in a more narrow measurement window such that the top line of FIG. 2 would show a narrower square wave shape, corresponding to a single grid box width, for example. In this approach, the user may base the delay on known information relating to a general location of the fluid level, such as may be obtained from acoustical or gravimetric techniques.

The system as described may be used to obtain measurements with accuracy on the order of one foot or so (i.e., one nanosecond in the time domain). In general, measurements accurate to within about 10 feet are sufficient to allow reasonable pump control.

Because the conductivity of hydrocarbons differs significantly from that of water, signal strength may be used to allow for determining not just the presence of fluid, but the type. In experimental trials, the amplitude difference in signal between a return from an oil surface and that from a water surface is about 1.3:1. If a level and thickness of the producing formation is known, and the apparatus 100 is able to determine a fluid level, and that the fluid at that level is water, then an oil/water ratio can be determined.

Figure 3:
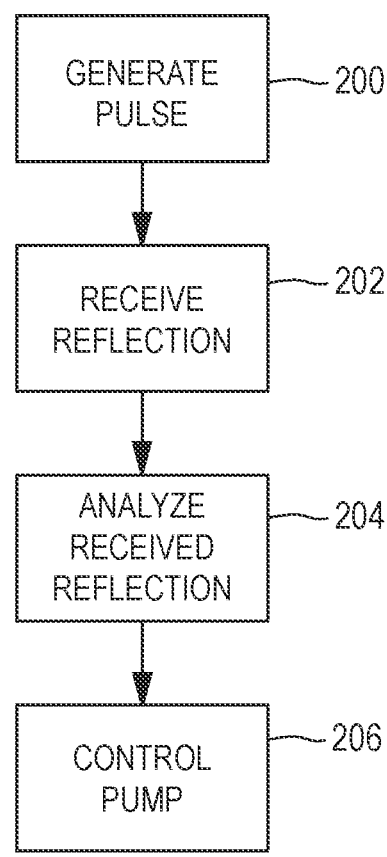
FIG. 3 is a flowchart illustrating a method in accordance with an embodiment of the present invention.

FIG. 3 is a flowchart illustrating a method of operation in accordance with an embodiment of the invention. The pulse generator 120 is used to generate a pulse 200 that propagates along the borehole in a down hole direction. The receiver 122 receives 202 a return signal reflected from the surface of the fluid that propagates back up the wellbore. The processor 124 then analyzes 204 the received signal to determine a distance to the fluid surface. Based on the determined distance, the pump controller 126 operates to control 206 the operation of the pump 110 as discussed above.

Those skilled in the art will appreciate that the disclosed embodiments described herein are by way of example only, and that numerous variations will exist. The invention is limited only by the claims, which encompass the embodiments described herein as well as variants apparent to those skilled in the art.

The invention claimed is:

1. A system for measuring a fluid level in a casing-lined wellbore, comprising:
   a pulse generator, positionable and operable to generate a pulse of electromagnetic energy to propagate along the wellbore towards a surface of the fluid;
   a detector, positionable and operable to detect a portion of the electromagnetic pulse reflected from the surface of the fluid and propagated along the wellbore towards the detector;
   a processor, configured and arranged to receive a signal from the detector representative of the detected portion of the electromagnetic pulse and to analyze it to determine a level of the surface of the fluid; and
   a pump controller, configured and arranged to receive distance information from the processor and to use the distance information to control the operation of a pump located in the wellbore and wherein once the detector detects the portion of electromagnetic pulse reflected from the surface, reception of the signal is inhibited.

2. A system as in claim 1, wherein the pump controller reduces pump capacity when the distance information indicates that the fluid level is near a pump level in the wellbore.

3. A system as in claim 1, wherein the pump controller stops the pump when the distance information indicates that the fluid level is at or below a pump level in the wellbore.

4. A system as in claim 1, wherein the pump controller increases pump capacity when the distance information indicates that the fluid level is at a level greater than a selected amount greater than the pump level.

5. A system as in claim 1, wherein the processor is further configured and arranged to analyze the signals to obtain information relating to a composition of the fluid based on an amplitude of the detected portion.

6. A system as in claim 5, wherein the composition information comprises a proportion of water to hydrocarbon.

7. A system as in claim 1, wherein a rate of change of successive distance information measurements is used to determine whether the fluid level is rising or falling, and the pump controller further controls the operation of the pump based on the direction of change of the fluid level.

8. A system as in claim 1, wherein a rate of change of successive distance information measurements is used to determine whether the fluid level is rising or falling, and the pump controller further controls the operation of the pump based on a magnitude of change of the fluid level.

9. The system as in claim 1 wherein the detector is configured to be powered on during a time window delayed with respect to the generation of electromagnetic energy.

10. A method for controlling a pump located in a casing-lined wellbore, comprising:
    generating a pulse of electromagnetic energy to propagate along the wellbore towards a surface of the fluid;
    detecting with a detector a portion of the electromagnetic pulse reflected from the surface of the fluid and propagated along the wellbore towards the detector;
    receiving a signal from the detector representative of the detected portion of the electromagnetic pulse;
    analyzing the signal to determine a level of the surface of the fluid; and
    controlling the operation of the pump, based on the determined surface level of the fluid wherein once the detector detects the portion of electromagnetic pulse reflected from the surface, reception of the signal is inhibited.

11. A method as in claim 10, wherein the controlling comprises reducing pump capacity when the determined surface level is near a pump level in the wellbore.

12. A method as in claim 10, wherein the controlling comprises stopping the pump when the distance information indicates that the fluid level is at or below a pump level in the wellbore.

13. A method as in claim 10, wherein the controlling comprises increasing pump capacity when the distance information indicates that the fluid level is at a level greater than a selected amount greater than the pump level.

14. A method as in claim 10, further comprising determining information relating to a composition of the fluid based on an amplitude of the detected portion.

15. A method as in claim 14, wherein the composition information comprises a proportion of water to hydrocarbon.

16. A method as in claim 10, wherein the controlling further comprises controlling the operation of the pump based on a direction of change of the fluid level over successive measurements.

17. A method as in claim 10, wherein the controlling further comprises controlling the operation of the pump based on a magnitude of change of the fluid level over successive measurements.

18. The method as in claim 10, wherein the detector is configured to be powered on during a time window delayed with respect to the generation of electromagnetic energy.

* * * * *